United States Patent [19]

Copeland

[11] Patent Number: 4,711,738

[45] Date of Patent: Dec. 8, 1987

[54] MECHANICAL DISHWASHING RINSE COMPOSITION HAVING A LOW FOAMING SULFONIC ACID RINSING AGENT AND A SOURCE OF ACTIVE HALOGEN

[75] Inventor: James L. Copeland, Burnsville, Minn.

[73] Assignee: Ecolab Inc., St. Paul, Minn.

[21] Appl. No.: 821,412

[22] Filed: Jan. 21, 1986

Related U.S. Application Data

[63] Continuation of Ser. No. 646,257, Aug. 29, 1984, abandoned.

[51] Int. Cl.$^4$ .......................... F01B 19/00; F16J 3/00

[52] U.S. Cl. .......................... 252/95; 252/186.35; 252/187.25; 252/558; 252/DIG. 10; 134/25.2; 134/26

[58] Field of Search .............. 252/531, 533, 535, 552, 252/554, 187.25, 187.26, 95, 99, 104, 135, 174.24, DIG. 14

[56] References Cited

U.S. PATENT DOCUMENTS

| | | | |
|---|---|---|---|
| 3,248,334 | 4/1966 | Teot et al. | 252/161 |
| 3,248,335 | 4/1966 | Teot et al. | 252/161 |
| 3,793,212 | 2/1974 | Gray et al. | 252/99 |
| 3,929,661 | 12/1975 | Nakagawa et al. | 252/103 |
| 4,071,463 | 1/1978 | Steinhauer | 252/103 |
| 4,174,289 | 11/1979 | Sorgenfrei et al. | 252/103 |
| 4,390,448 | 6/1983 | Boden et al. | 252/187.26 |
| 4,552,680 | 11/1985 | Hartman et al. | 252/102 |

*Primary Examiner*—Paul Lieberman
*Assistant Examiner*—John F. McNally
*Attorney, Agent, or Firm*—Merchant, Gould, Smith, Edell, Welter & Schmidt

[57] ABSTRACT

A low foaming rinse composition that can be used in spray warewashing machines to provide sanitization, bleaching, and rinsing comprises water, an effective bleaching-sanitizing amount of an active-halogen composition, a sulfonate rinse agent, and an optional threshold agent. The sulfonate rinse agent is a $C_{1-9}$ alkylated diphenyl oxide sulfonic acid or sulfonate salt composition.

18 Claims, No Drawings

MECHANICAL DISHWASHING RINSE COMPOSITION HAVING A LOW FOAMING SULFONIC ACID RINSING AGENT AND A SOURCE OF ACTIVE HALOGEN

This is a continuation of application Ser. No. 646,257, filed Aug. 29, 1984, now abandoned.

FIELD OF THE INVENTION

The invention relates to aqueous, low foaming, active halogen-containing rinse solutions and compositions, rinse concentrates and methods of their use and preparation. More particularly, the invention relates to stable rinse solutions and compositions having a sulfonate rinse agent and a source of active halogen which provides rinsing action and stain removal or bleaching in the substantial absence of foam.

BACKGROUND OF THE INVENTION

In household, commercial, industrial or institutional warewashing or dishwashing, commonly available dishwashing machines have mechanical spray mechanisms in which ware are sprayed first with a cleaning solution and second with a rinsing solution. This functional design is substantially different than the design of a household laundry machine in which objects to be cleaned are immersed in a cleaning medium. Typically, in spray washers both the cleaning solutions and rinsing solutions are held in machine reservoirs, pumped to a spray mechanism where the cleaning or rinsing solution is directed under pressure onto the ware, and after cleaning or rinsing, the solutions are returned to the reservoirs. Such spray mechanical washers can employ a variety of combinations of cleaning, rinsing and other steps. However, most machines operate with one or more steps of the following sequence: scraping, rinsing, washing, rinsing and sanitizing. Commonly, machines are classified by the temperature of their cleaning and rinsing steps. High temperature machines use thermal energy to achieve a sanitizing action while low temperature machines use chemical sanitizing agents. In high temperature machines a minimum of two operations are required. The ware is contacted at high temperatures (140°-180° F.) with an alkaline low foaming cleaning solution and are then rinsed with water at a sanitizing temperature. The water contains a rinse aid to promote drying with a minimum of spotting or filming. In low temperature machines, the ware are contacted with hot tap water containing an alkaline, low foaming cleaning solution, are then rinsed with hot tap water (120°-140° F.) which contains a rinse agent, and are contacted with an active halogen composition to achieve acceptable sanitization. The concentration of active halogen required to achieve effective sanitization typically falls within the range of about 50-100 parts of available halogen or chlorine per million parts of the rinse composition.

The alkaline cleaning compositions used in mechanical spray warewashing machines can be liquid, granular or solid in form. These "high performance" cleaners commonly contain active cleaning agents such as alkaline ingredients, including alkali metal hydroxides, phosphates and silicates, as well as chlorine-yielding compounds, defoamers and organic threshold or chelating agents. See, for example, the disclosures of Mizuno et al, U.S. Pat. No. 3,166,513; Sabatelli et al, U.S. Pat. No. 3,535,285; Sabatelli et al, U.S. Pat. No. 3,579,455; Mizuno et al, U.S. Pat. No. 3,700,599; and Copeland et al, U.S. Pat. No. 3,899,436 for a discussion of such high performance cleaners.

The active halogen or oxidant bleach compositions can be present in the alkaline cleaners or can be separately added with the alkaline cleaner to provide a bleaching sanitizing effect during a cleaning cycle. The use of active halogen compositions in high performance cleaners in the cleaning cycle suffers from certain drawbacks. First, the active halogen compositions often interact with the components of the highly alkaline cleaners, reducing the effective concentration of active halogen and the halogenreactive cleaner components. Second, in the cleaning cycle a majority of the halogen is consumed in non-stain removing or non-sanitizing reactions. A substantial excess of the active halogen composition is commonly employed in the cleaning composition since the active halogen comes in contact with large concentrations of readily oxidizable organic materials which can rapidly react with halogen to reduce the concentration of active halogen. Thus, a large excess of active halogen composition is used to insure that at least some active halogen remains in the cleaner solution to destain and sanitize the tableware after the majority of the active halogen interacts with and is absorbed or reduced by the organic soils. The use of substantial quantities of active halogen composition in the cleaner is an uneconomic waste of the chemical. Clearly, an economic and operational benefit can result from the removal of the active halogen composition from the cleaning compositions which are added to the wash cycle.

In view of the above factors, combining a rinse agent with an active halogen composition in a rinse cycle would prevent problems that arise due to the use of the active halogen compound in the cleaner solutions. One option involves separately metering the rinse agent and active halogen composition into the rinse cycle of the warewashing machine. However, this would result in an uneconomic duplication of metering systems. Accordingly, for economic and practical reasons a substantial need exists for a rinse composition which combines a rinse agent and an active halogen composition.

Rinse agents or sheeting agents are low foaming compounds commonly added to rinse water to produce a rinsing or sheeting action which insures substantial rinse water removal, and to aid in the prevention of spotting. The precise mechanism through which rinse agents cause the rinse water to form continuous sheets which drain cleanly from the surface is unknown. Commonly-available commercial rinse agents typically comprise a low foaming surface active agent made from homopolymers or copolymers of an alkylene oxide such as ethylene oxide or propylene oxide or mixtures thereof. Typically, the surfactants are formed by reacting an alcohol, a glycol, a carboxylic acid, an amine or a substituted phenol with various proportions and combinations of ethylene oxide and propylene oxide to form both random and block copolymer substituents. Rinse agents containing substituents formed from an alkylene oxide are particularly sensitive to rapid degradation in the presence of active halogen compounds. Accordingly, the combination of active halogen with the majority of presently-available rinse compositons in the rinse cycle would result in degradation of both the rinse agent and the active halogen.

Rinse agents and other components of rinse compositions desirably have certain characteristics. The rinse agent must be soluble in an aqueous solution of active halogen composition. The rinse agent must not cause the consumption or degradation of more than about 25 wt-% and preferably less than 10 wt-% of the original active halogen composition. The active halogen must not in turn degrade the rinse agent. Further, the rinse agent compositions must produce a substantially complete sheeting effect in the final rinse. The rinse composition must be substantially resistant to the production of large amounts of foam. Foaming is a substantial drawback in machine spray washers using a pump that transfers rinse solution from the reservoir to the spray mechansim. The pumps used in the machines are designed to efficiently move water which is substantially noncompressable, but cannot move foam which is substantially highly compressable air. In the presence of foam, the delivery of rinse water can be prevented, and in extreme cases the presence of foam can result in damage to the pump.

BRIEF DESCRIPTION OF THE INVENTION

I have found a low foaming, sanitizing rinse composition for low temperature and high temperature machine warewashing which comprises an effective bleachingsanitizing amount of an active halogen compound and an effective low foaming rinse agent comprising an alkyl diphenyl oxide sulfonic acid compound, or sulfonate salt thereof in an aqueous medium which provides rinsing with little foam. The rinse agent is both chemically and physically compatible during storage with the active-halogen composition.

Surprisingly, I have found that certain alkyl diphenyl oxide sulfonic acid or sulfonate rinse aids provide the required solubility in the solution of the active halogen compound, effective or "continuous" sheeting, reduced foam production, and chemical compatibility with relatively high concentrations of active halogen compositions for extended periods of time in the absence of substantial degradation of either the surfactant or the active halogen source. In the context of this invention "rinse agent" refers to the alkyl diphenyl oxide sulfonic acid composition, "rinse composition" refers to the concentrate composition of water, the rinse agent, the active halogen compound, and "rinse solution" refers to the fully diluted aqueous solution which is sprayed on the ware within the machine spray warewasher.

The present compositions are intended for use as rinse compositions or solutions, as opposed to "detergent" compositions, which are intended to perform the primary cleaning function. Therefore, the present compositions and solutions are free of significant amounts of the alkaline components or builder salts which are necessary to the effectiveness of "high performance" liquid or solid detergents. Therefore, the present compositions will contain no more than about 2.5% of such components, and preferably will contain less than about 1% of alkaline components such as alkali metal hydroxides, silicates, phosphates, carbonates, bicarbonates and the like. Substantial amounts of such compounds are incompatible with the present compositions since they can inhibit sheeting, leave solid deposits on the ware and degrade or inhibit the action of the other ingredients present.

Sulfonic Acid Rinse Agent

The alkyl diphenyl oxide sulfonic acid surfactants useful in the rinse agent composition of the invention include compounds and mixtures of compounds of the formulae:

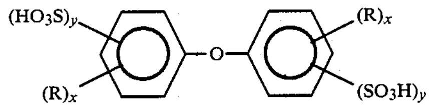

and the alkali and alkaline earth metal salts thereof, wherein each x is 0 to 4, each y is 0 to 4, the sums of x and y are both at least one and the sum of x and y is less than or equal to 6; R is hydrogen or a $C_1$–$C_9$ alkyl group with at least one R being alkyl. Preferably, the alkyl group is an alkyl group of about 2 to 8 carbon atoms, x is 1 or 2, and y is 1 or 2, and the sum of x and y is 4 or less. Examples of typical alkyl groups include methyl, ethyl, n-propyl, isopropyl, n-butyl, t-butyl, amyl, t-amyl, hexyl, 2-ethyl(hexyl), n-octyl, n-nonyl, n-decyl, n-dodecyl and the like. Most preferably, R is an alkyl group of about 3 to 8 carbon atoms, and the sum of x and y is about 2 to 4. The alkyl group can be an aliphatic straight chain primary group, a secondary or a tertiary group. Preferred rinse agents are about 10% to 90% dialkylated and about 10% to 100% disulfonated, most preferably about 70 to 90% disulfonated.

The preferred sulfonate rinse agents can be made by alkylating diphenyl oxide and sulfonating the alkylate, forming a mixture of mono- and dialkylated mono- and disulfonates. Dihexyldiphenyl ether disulfonate sodium salt is commercially available as Dow XD-8292.00. A series of commercially available mono-alkyl or di-alkyl diphenyl oxide monosulfonic acid or di-sulfonic acid surfactants having alkyl group with 10 or more carbon atoms are made by Dow Chemical Co., Midland, MI, and sold as the DOWFAX® series.

Active Halogen Composition

Organic and inorganic halogen compositions can be used as the active halogen source in the rinse agents of the present invention. The active halogen composition or halogen-oxidant bleach must be compatible and stable in aqueous solution or suspension. Furthermore, they must not detrimentally interact with the sulfonate rinse agent to produce physical separation of the liquid rinse composition or chemical degradation. The strength of an aqueous solution containing the active halogen composition is measured in terms of available halogen which is measured as $X_2$, wherein X can be F, Cl, Br, or I, preferably Cl or Br. Most preferably X is Cl. The term "available halogen" commonly refers to the ability of the composition to liberate halogen when introduced into solution. Such ability is also called oxidizing power.

Organic sources of the active halogen which can be used at dilute (1–2%) concentrations include chloramines, chlorimines, chloramides and chlorimides, such as potassium dichloroisocyanurate, sodium dichloroisocyanurate, sodium dichloroisocyanurate dihydrate, trichlorocyanuric acid, 1,3-dichloro-5,5-dimethylhydantoin, n-chlorosulfamide, chloramine-T, dichloramine-T, chloramine-B, and dichloramine-B and mixture thereof. Organic agents are commonly unstable in aqueous solutions above 1–2% by weight since the HOCl generated by the organic source of active halogen in turn can attack functional groups in the organic portion of the molecule.

Therefore, preferred active halogen compounds for use in the invention include inorganic sources of halogen such as those which produce halogen as $X_2$, $OX^-$, HOX and the like, wherein X is Br or Cl. Such inorganic bleaching agents include alkali metal hypohalites, monobasic calcium hypohalite; dibasic magnesium hypohalite; halogenated condensed phosphates, their hydrated species, and mixtures thereof. The most preferred active halogen compounds yield hypochlorite anions in aqueous solution at the appropriate pH. The hypochlorite ion can be chemically represented as $OCl^-$.

Examples of hypochlorite yielding compounds include alkali metal and alkaline earth metal hypochlorites including lithium hypochlorite, sodium hypochlorite, potassium hypochlorite, monobasic calcium hypochlorite, dibasic magnesium hypochlorite and mixtures thereof.

Preferably, the active halogen source will be employed in the present rinse compositions in relatively high concentrations, as opposed to the concentrations employed in detergent formulations in which the halogen source functions as an adjunct cleaning agent in combination with alkaline builder salts and conventional surfactants. Therefore, the present rinse compositions will comprise about 2.5–10%, most preferably about 3–7.5%, of the active halogen source, e.g. 4–6% by weight NaOCl. At these concentrations, the present rinse compositions are storage-stable stable but remain highly effective to sanitize and/or destain ware when diluted to form sprayable rinse solutions as described hereinbelow.

Threshold Agents

Threshold agents (i.e., complexing agents, sequestering agents), that can be used in the invention to prevent the precipitation of hardness components in service water can be used in the novel rinse agent compositions of the invention. Commonly, service water used in the rinse cycle to dilute the rinse composition to form the rinse solution can have substantial proportions of hardness components, such as calcium and magnesium ions. In the presence of certain rinse agents, these ions can precipitate and leave unsightly deposits of mixed calcium and magnesium salts, generally in the form of carbonates. These deposits often include other hardness components such as ferrous or ferric compounds and other common cations. Threshold agent act to prevent or delay crystal growth of these calcium or magnesium compounds. While the threshold mechanism is unknown, the threshold agents are used at concentrations substantially less than amounts that would be stoichiometric with respect to the hardness components. However, greater than trace amounts of threshold agent are known to thermodynamically delay crystal growth.

Such threshold agents can be both organic and inorganic but must be resistant to reaction with the halogen oxidizing compound and must not have an undesirable rinse action-inhibiting interaction with the sulfonate rinse agent. The most common or widely used threshold agents are those that coordinate metal ions through oxygen or nitrogen donor atoms or groups containing oxygen or nitrogen atoms. Typical organic complexing agents include, for example, N-hydroxy-ethylaminodiacetic acid, nitrilotriacetic acid, ethylene diamine tetraacetic acid, and its mono, di, tri and tetrasodium salts, maleic anhydride, homo or interpolymers of polyacrylic acid or polymethacrylic acid, and mixtures thereof.

The preferred threshold agents for use in the rinse agent of the invention comprise polyacrylic homopolymers and interpolymers having pendent carboxyl groups and molecular weights of about 500 to about 5,000. These threshold agents have been found to be effective in complexing the hardness components of service water, have been found to be stable in the presence of strong chlorine bleaches and are soluble in the presence of substantial quantities of sulfonate surfactants.

In addition to the above-described active-halogen composition, sulfonate rinse agent and threshold agent, the novel rinse agent compositions of the invention can contain optional components that can enhance performance, stability, aesthetic appeal, processing, packaging, or consumer acceptance. Such materials include optional coloring agents and perfumes. These materials should be selected from dyes and perfume varieties which are stable against degradation in the presence of strong active halogen agents.

Small amounts of alkali metal hydroxides, e.g., less than about 1%, can also be used to adjust the pH of the rinse compositions. For example, about 0.1–0.5% sodium hydroxide can be used to adjust the final pH of the composition to about 10–12.

The rinse compositions of the invention can be prepared by mixing each of the above-described components in an appropriate concentration in essentially any order to form a liquid concentrate which can be metered into the reservoir to form a rinse solution in the machine dishwasher. The rinse solution provides an effective concentration of the components to clean, sanitize, and cause sheeting action in the rinse cycle. Commonly, the concentration of the active halogen composition present in the final rinse solution should range from about 1 to 200 parts of rinse water for an effective sanitizing, bleaching or stain removing action. Preferably the concentration of active halogen composition will range from about 2 to 100 parts of active halogen, and most preferably, for reasons of economy and effectiveness, the concentration of active halogen will range from about 10 to 50 parts of hypochlorite, per million parts of rinse water.

Similarily, the concentration of sulfonate rinse agent in the final rinse water should range from about 1 to 200 parts of sulfonate rinse agent per million parts of rinse water to obtain sufficient sheeting action which results in substantially complete rinsing of the tableware. Preferably, the concentration of the sulfonate rinse agent ranges from about 2 to 100 parts of sulfonate rinse agent, and most preferably, for reasons of economy and effective rinsing, the concentration of the sulfonate rinse agent ranges from about 10 to 80 parts of the sulfonate rinse agent per million parts of the final rinse water.

The concentration of the threshold agent commonly depends on the concentration of hardness components (commonly less than 200 ppm) in service water provided by local water utilities. The concentration of the threshold agent should be maintained in an amount effective to inhibit or reduce the rate of the precipitation of hardness components in the rinse solution. Service water in most locales can be successfully treated if the concentration of the threshold agent is maintained at less than 150 parts of threshold agent per million parts of total final rinse water. However, should deposits of calcium and magnesium carbonate appear on tableware, the concentration of the threshold agent can be augmented. Preferably, the concentration of the threshold agent in the final rinse solution for use in most available service water (hardness of 150 ppm or less) ranges from about 0.2 to 25 parts of the threshold agent, and most preferably, for reasons of high performance and economy, the concentration of the threshold agent ranges from about 0.5 to 10 parts of the threshold agent per million parts of the final rinse water.

Commonly, concentrates of the components can be prepared which can be diluted to provide a final rinse solution having active components within the above concentrations by forming in an aqueous base a rinse agent concentrate containing from about 0.1 to 15 wt-% of a source of the active halogen (halogen-oxidizing bleach) composition capable of releasing active halogen into the aqueous solution, about 0.1 to 15 wt-% of the sulfonate surfactant and, optionally, about 0.1 to 20 wt-% of the threshold agent. Preferably, the rinse agent concentrates of the invention contain a major portion of an aqueous medium, e.g. water, about 2.5 to 10 wt-% of an active halogen compound, in combination with about 0.5 to 12 wt-% of the sulfonate surfactant and, optionally, about 0.5 to 15 wt-% of the threshold agent. Most preferably, the rinse agent of the invention contains water, about 3 to 7.5 wt-% of sodium hypochlorite, about 1 to 10 wt-% of the sulfonate surfactant, and about 1 to 10 wt-% of a polyelectrolyte such as a polyacrylic acid threshold agent having a molecular weight of about 300 to 5,000. Preferably, the amount of sulfonate surfactant used will be about equal to, or only slightly (1–5%) greater than the amount of hypochlorite used.

The above-described rinse agents can be used in institutional, industrial and household dishwashing machines that have the capability of injecting controlled amounts of the rinse agent into a final rinse water. The rinse composition of the invention can be metered into a machine dishwasher at a ratio of one part of the rinse composition per each 4,000 or more total parts of rinse solution. Preferably, the ratio is one part of rinse composition per each 5,000 to 100,000 parts of the final rinse solution, depending on the concentration of the components in the rinse composition concentrate.

In household and commercial operations, washing of dishware comprises at a minimum two stages, a washing cycle and a rinsing cycle.

A washing cycle is usually performed using aqueous solutions or suspensions of highly alkaline detergent compositions in water maintained at an elevated temperature. The washing cycle can commonly be performed at a relatively low temperature, i.e., at 120°–160° F., or at a relatively high temperature, commonly 160°–200° F. The rinse cycle or last stage of the dishwasher operation is usually conducted at a temperature that ranges from 120°–200° F., depending on the need to use high temperature sanitizing. An optional scraping or first stage cycle in which larger agglomerates of foods can be removed from the dishes, the water is maintained at a temperature of from about 100° to 120° F. Typically, food soil load is highest in the optional scraping or preparatory cycle, lower in the wash cycle and is negligible in the rinse cycle, except for staining that is generally physically associated or chemically bonded into the surface of the ware.

In order to conserve heat and water it is customary to feed used rinse water back into the wash or scraping stage.

The invention will be further described by reference to the following detailed examples.

EXAMPLE I

Into a 2,000 ml glass beaker equipped with magnetic stirrer was placed 235.8 grams of soft water. Into the water under stirring was added 625.0 grams of an 8.0 wt-% aqueous solution of sodium hypochlorite (5.1% NaOCl) and the mixture was stirred until uniform. Into the solution was added 111.2 grams of a 45 wt-% aqueous solution of a sodium dihexyl diphenyl oxide sulfonate (90% dialkylate and about 98% disulfonate). Also added was 10.0 grams of a 50 wt-% aqueous solution of sodium polyacrylate (an average polymer molecular weight of 2,000–5,000). After the addition was complete and the mixture was uniform, the pH was adjusted to 11.5 with 0.22 g of 50 wt-% aqueous sodium hydroxide. During addition of the components, the temperature was maintained between 60°–80° F.

EXAMPLE II

Into a 2,000 ml glass beaker equipped with a magnetic stirrer was placed 280 grams of soft water. Into the water under stirring was added 600 grams of an 8 wt-% aqueous solution of sodium hypochlorite (4.8% NaOCl) and the mixture was stirred until uniform. Into the solution was added 120 grams of DOWFAX® 2A1 (a 45 wt-% solution of a sodium alkyl diphenyl oxide sulfonate 90% monoalkylate and greater than 90% disulfonate wherein the alkyl groups are $C_{10}$ linear groups, made from an alpha olefin). After the mixture was uniform, the pH was adjusted to 11.5 with 0.27 g of 50 wt-% aqueous sodium hydroxide. During blending, the temperature was maintained between 60° and 80° F.

EXAMPLE III

Example II was repeated with DOWFAX® 3B2, a sodium alkyl diphenyl oxide sulfonate (90% monoalkylate and greater than 90% disulfonate having $C_{12}$ branched alkyl groups derived from a tetrapropylene oligomer). The pH was adjusted to 11.5 with 0.34 g of 50% aqueous sodium hydroxide.

EXAMPLE IV

Into a 2,000 ml glass beaker equipped with a magnetic stirrer was placed 283.3 grams of soft water. Into the water under stirring was added 600 grams of an 8% aqueous sodium hypochlorite (4.8% NaOCl) solution. After the solution became uniform, 40 grams of DOWFAX® 2A1 was added (an alkylated diphenyl oxide sulfonate which is 90% monoalkylate and greater than 90% disulfonate having $C_{10}$ linear alkyl groups formed from an alpha olefin). After the mixture became uniform, 66.7 grams of a 45 wt-% aqueous solution of an alkyl diphenyl oxide sulfonate (90% monoalkyl and about 98.3% disulfonate) having $C_6$ linear alkyl groups was added. Along with the diphenyl oxide sulfonate was added 10 grams of a 50 wt-% aqueous solution of a sodium polyacrylate having a polymer molecular weight between 2,000 and 5,000. After the solution was uniform the pH was adjusted to 11.5 with 0.20 g of 50% aqueous sodium hydroxide. The temperature of the mixture during preparation was maintained between 60° and 80° F.

EXAMPLE V

Into a 2,000 ml glass beaker equipped with a magnetic stirrer was placed 373 grams of soft water. Into the water under stirring was added 500 grams of a 10% aqueous sodium hypochlorite solution (5% NaOCl). After the solution became uniform, 125 grams of dihexyl diphenyl ether disulfonate sodium salt (45% active in water) was added. After thorough mixing, the pH was adjusted to 11.5 by the addition of 0.2% by weight of 50% aqueous sodium hydroxide and filtered. The temperature of the mixture during preparation was not allowed to exceed 90° F.

TABLE 1

| Sheeting Evaluation | | | |
|---|---|---|---|
| | | Concentration for Continuous Water Sheeting* | |
| Product of Example | Temperature | Glass | #316 Stainless Steel |
| I | 160° F. | 600 ppm (30 ppm)** | 1400 ppm (70 ppm) |
| II | 160° F. | 450 ppm (22.5 ppm) | 1300 ppm (65 ppm) |
| III | 160° F. | 550 ppm (27.5 ppm) | 1400 ppm (70 ppm) |
| IV | 160° F. | 500 ppm (25 ppm) | 1400 ppm (70 ppm) |
| Pluronic ® 25R2 | 160° F. | (90 ppm) | (100 ppm) |

*Concentration of rinse composition for continuous films of water to be formed over surface under evaluation.
**Concentration in (.) is active surfactant concentration.

TABLE 2

| Foaming Evaluation (Dynamic Foam) | | | |
|---|---|---|---|
| Product of Example | Concentration | Foam Height | Temperature |
| I | 500 ppm | 0.50 inches | 120° F. |
| I | 500 ppm | 0.50 inches | 160° F. |
| II | 500 ppm | 6 inches | 120° F. |
| II | 500 ppm | 6 inches | 160° F. |
| III | 500 ppm | 8 inches | 120° F. |
| III | 500 ppm | 8 inches | 160° F. |
| IV | 500 ppm | 3 inches | 120° F. |
| IV | 500 ppm | 3 inches | 160° F. |

TABLE 3

| Chlorine Stability, 240 Hours at 100° F. | | | |
|---|---|---|---|
| Product of Example | Initial Chlorine | Final Chlorine | Percent Remaining |
| I | 5.0 | 4.65 | 93.0 |
| II | 4.78 | 4.60 | 96.2 |
| III | 4.85 | 4.67 | 96.3 |
| IV | 4.75 | 4.54 | 95.6 |
| Control* | 5.0 | 4.75 | 95.0 |

*5.0% NaOCl solution with pH adjusted to 11.50.

The data presented in Table 1 entitled "Sheeting Evaluation" was obtained using a Champion 1-KAB machine dishwasher having wash and rinse temperatures of about 160° F. Test pieces were placed in the machine having a glass door to permit visual observation of the test pieces. For the evaluation, the test pieces were washed in soft water three times on automatic cycle using 200 grams of an alkaline detergent prepared by blending 30 wt-% sodium metasilicate, 35% sodium tripolyphosphate, 3 wt-% Plurafac® surfactant No. RA-43, and 32% sodium carbonate. During the three wash cycles no rinse additive was used. To determine the sheeting effect, the machine was filled with water and set on manual. Into the water was added 500 parts of Mazola corn oil per million parts of rinse water, and a minimum measured amount of rinse composition of the Examples. The mixture was circulated for 3 minutes and the concentration of rinse additive was progressively increased by injecting increasing amounts of rinse composition until a substantially continuous sheeting effect of the rinse water was noted over substantially all the test pieces. The minimum concentration for continuous sheeting was noted and recorded on Table 1.

The data recorded in Table 2 entitled "Foaming Evaluation (Dynamic Foam)" was generated in a foam test device which is a cylindrical container 8 liters in volume, 15 centimeters in diameter and 50 centimeters in height equipped with an electric hot plate for temperature control, and a pump to recirculate the test solution at 6 psi via a means to direct a spray of the test solution onto the surface of the contents of the solution to generate foam.

Three liters of a test solution prepared in soft water which contained 6.0 grams of a dry blend of 30 wt-% sodium metasilicate, 35 wt-% sodium tripolyphosphate, 3% Plurafac® RA-43 and 32 wt-% sodium carbonate was used (200 ppm in the aqueous detergent). The rinse compositions were evaluated at 500 parts per million by adding 1.5 grams of the rinse composition of each example to 3 liters of the test detergent. The tests were performed by recirculating the detergent solution through the spray means in the dynamic foam tester for 5 minutes to verify that the initial equilibrated foam was no more than ½ inch above the surface of the test solution. After the equilibrated foam level was established, the rinse composition was added to the test solution and after 5 minutes, the foam height was measured.

The chlorine stability test was performed by placing about 400 grams of the fully compounded rinse composition in capped translucent polyethylene bottles which was stored for 240 hours at 100° F. The chlorine concentrations were measured by a standard iodometric titration with thiosulfate.

An examination of the Tables shows that the rinse compositions of the Examples had acceptable sheeting properties, generated 0.5–8.0 inches of foam at 120° and 160° F., and contained stable chlorine. The compositions of Examples II and III, wherein the rinse additives were $C_{10}$- and $C_{12}$-alkylated, respectively, generated substantially more foam than the compositions of the other Examples. The $C_6$-alkylated additive generated substantially less foam than the other additives, and reduced the foam generated by the $C_{12}$-alkylated additive. The performance of the rinse composition of Example V was similar to that of Example I.

The above Examples, data, and specification provide a basis for understanding the invention. However, since many embodiments of the invention can be made without departing from the spirit and scope of the invention, the invention resides wholly in the claims hereinafter appended.

What is claimed is:

1. A low foaming and sanitizing or bleaching rinse composition for machine warewashing which consisting essentually of:

(a) a major portion of an aqueous medium;

(b) about 2.5–15 wt-% based on the total weight of the composition of an active halogen compound; and (c) an effective amount of a low foaming sulfonate rinse agent of the formula:

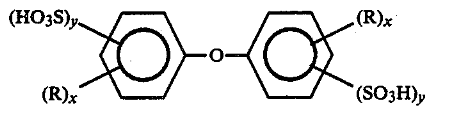

and the alkali metal or alkaline earth metal salts thereof, wherein x is 0 to 4, y is 0 to 4, the sums of x and y are at least one, and the sum of x and y is less than or equal to 6; and each R is independently a hydrogen or a $C_1$-$C_9$ alkyl group, at least one R is alkyl;

and wherein the rinse composition is free of significant amounts of alkaline detergent builder salts.

2. The rinse composition of claim 1 which contains less than about 1% of said alkaline detergent builder salts.

3. The rinse composition of claim 1 wherein R is an alkyl group having an average of 2-8 carbon atoms, x and y are independently 1 or 2, and x+y is less than or equal to 4.

4. The rinse composition of claim 3 wherein the alkyl group has about 3 to 8 carbon atoms.

5. The composition of claim 4 wherein the rinse agent is dihexyl diphenyl ether disulfonate sodium salt.

6. The rinse composition of claim 1 which further comprises an amount of a threshold agent effective to prevent or delay the precipitation of alkaline earth metal hardness components.

7. The rinse composition of claim 6 wherein the rinse agent comprises about 0.1 to 15 wt-% of the threshold agent.

8. The rinse composition of claim 7 wherein the threshold agent comprises an inorganic or organic polyelectrolyte.

9. The rinse composition of claim 8 wherein the polyelectrolyte comprises an acrylic homopolymer or interpolymer having pendant carboxyl groups.

10. The rinse composition of claim 1 wherein the concentration of the sulfonate rinse agent is about 0.1-20 wt-% of the composition.

11. The rinse composition of claim 1 wherein the concentration of the active-halogen composition is about 3.0 to 7.5 wt-% of the composition.

12. The rinse composition of claim 11 wherein the active-halogen composition comprises an alkali metal hypohalite composition.

13. The rinse composition of claim 12 wherein the alkali metal hypohalite is lithium hypochlorite, sodium hypochlorite, potassium hypochlorite, or mixtures thereof.

14. A dilute aqueous rinse solution which comprises an amount of the rinse composition of claim 1 effective to produce about 1 to 200 parts of active-halogen compound and about 1 to 200 parts of the sulfonate rinse agent each per million parts of the dilute aqueous rinse solution.

15. A method for cleaning tableware in a mechanical dishwasher which comprises:

(a) contacting stained and soiled tableware with an aqueous alkaline cleaning composition for a sufficient time at a sufficient temperature to remove soil to produce washed tableware; and (b) contacting the washed tableware with a rinse solution comprising the rinse agent of claim 1 to produce washed, bleached, and rinsed tableware.

16. A low foaming, bleaching and sanitizing rinse composition for machine warewashing which consists essentially of:

(a) a major proportion of water;

(b) about 2.5 to 20 wt-% of an alkali metal hypohalite;

(c) about 0.1 to 20 wt-% of a low foaming rinse agent of the formulae:

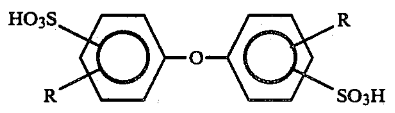

and alkali metal and alkaline earth metal salts thereof, wherein the agent is about 10-90% dialkylate, about 10-100% disulfonate, and R is an alkyl group of 3 to 8 carbon atoms;

(d) about 0.1 to 10 wt-% of a polyacrylic acid polymer having a molecular weight of about 500 to 5,000; and (e) less than about 1% of an alkali metal hydroxide, each weight percent being based on the total weight of the composition.

17. A rinse solution for use in the rinse cycle of a mechanical warewashing machine which comprises a major proportion of water and a sufficient amount of the agent of claim 15 to provide about 1 to 200 parts of the alkali metal hypohalite and about 1 to 20 parts of the rinse agent per million parts of rinse solution.

18. A method of operating a mechanical warewashing machine which comprises cleaning soiled dishes with an aqueous alkaline cleaner to produce washed dishes and rinsing the washed dishes with the rinse solution of claim to produce washed, bleached and rinsed ware.

* * * * *

UNITED STATES PATENT AND TRADEMARK OFFICE
CERTIFICATE OF CORRECTION

PATENT NO. : 4,711,738

DATED : December 8, 1987

INVENTOR(S) : J. L. Copeland

It is certified that error appears in the above-identified patent and that said Letters Patent is hereby corrected as shown below:

At Col. 2, line 13, for "The halogenreactive cleaner" read --The halogen-reactive cleaner--.

At Col. 3, lines 24-25, for "bleachingsa-nitizing amount" read --bleaching-sanitizing amount--.

At Col. 12, line 49, for "of claim to" read --of claim 15 to--.

Signed and Sealed this

Twenty-first Day of June, 1988

Attest:

DONALD J. QUIGG

*Attesting Officer*

*Commissioner of Patents and Trademarks*